United States Patent
Huck et al.

(10) Patent No.: US 12,245,625 B2
(45) Date of Patent: Mar. 11, 2025

(54) PEELER INPUT MECHANISM AND METHOD

(71) Applicant: Vanmark Equipment, LLC, Creston, IA (US)

(72) Inventors: Kyle V. Huck, Creston, IA (US); Chris L. Hudson, Lenox, IA (US); Alexander C. Herzberg, Prescott, IA (US)

(73) Assignee: Vanmark Equipment, LLC, Creston, IA (US)

( * ) Notice: Subject to any disclaimer, the term of this patent is extended or adjusted under 35 U.S.C. 154(b) by 1197 days.

(21) Appl. No.: 16/838,461

(22) Filed: Apr. 2, 2020

(65) Prior Publication Data

US 2020/0315237 A1 Oct. 8, 2020

Related U.S. Application Data

(60) Provisional application No. 62/829,419, filed on Apr. 4, 2019.

(51) Int. Cl.
*A23N 7/10* (2006.01)
*A23N 7/02* (2006.01)
*A23N 12/00* (2006.01)

(52) U.S. Cl.
CPC .............. *A23N 7/10* (2013.01); *A23N 7/02* (2013.01); *A23N 12/005* (2013.01)

(58) Field of Classification Search
None
See application file for complete search history.

(56) References Cited

U.S. PATENT DOCUMENTS

| | | | | |
|---|---|---|---|---|
| 8,439,730 B1 * | 5/2013 | Gasbarro | ............... | A22C 21/06 |
| | | | | 452/111 |
| 2016/0353791 A1 * | 12/2016 | Mathues | .................. | A23N 7/10 |

(Continued)

FOREIGN PATENT DOCUMENTS

| | | | | |
|---|---|---|---|---|
| CA | 2223862 A1 * | 7/1998 | ............... | A23N 7/00 |
| CN | 106403568 A * | 2/2017 | .............. | F26B 17/16 |

(Continued)

OTHER PUBLICATIONS

Machine translation of KR 20090030221 A performed on Jul. 21, 2023, Karasawa et al. (Year: 2009).*

(Continued)

*Primary Examiner* — Reginald Alexander
*Assistant Examiner* — Kevin Guanhua Wen
(74) *Attorney, Agent, or Firm* — Jason H. Foster; Kremblas & Foster

(57) ABSTRACT

A longitudinally movable infeed mechanism that allows for variations in the effective length of a peeler that uses rotating rolls to clean, peel or otherwise treat the exterior of objects, such as potatoes. The infeed mechanism has a surface, which can be the upwardly-facing surface of a conveyor belt, that conveys or is part of a structure that conveys the objects into the peel bed. A terminal end of the surface may move longitudinally parallel to the rolls, and may have a wall that prevents objects from moving past it. Thus, movement of the terminal end and wall defines the effective peel bed length and restricts the objects to that peel bed, permitting variation in amount of peeling by movement of the infeed mechanism.

14 Claims, 3 Drawing Sheets

(56) References Cited

U.S. PATENT DOCUMENTS

2017/0341865 A1\* 11/2017 Hanel et al. ........... B65G 15/08
2019/0062063 A1\* 2/2019 Baek ....................... B65G 21/20

FOREIGN PATENT DOCUMENTS

CN          107198105 A  \*  9/2017  ............... A23L 7/10
KR     20090030221 A  \*  3/2009  ............... A23N 7/02

OTHER PUBLICATIONS

Machine translation of CN 106403568 A performed on Jul. 21, 2023, Wang (Year: 2017).\*
Machine translation of CN 107198105 A performed on Jul. 21, 2023, Pan (Year: 2017).\*

\* cited by examiner

PEELER INPUT MECHANISM AND METHOD

CROSS-REFERENCES TO RELATED APPLICATIONS

This application claims the benefit of U.S. Provisional Application No. 62/829,419 filed Apr. 4, 2019. The above prior application is hereby incorporated by reference.

STATEMENT REGARDING FEDERALLY-SPONSORED RESEARCH AND DEVELOPMENT (Not Applicable)

THE NAMES OF THE PARTIES TO A JOINT RESEARCH AGREEMENT (Not Applicable)

REFERENCE TO AN APPENDIX (Not Applicable)

BACKGROUND OF THE INVENTION

The invention relates generally to processing of discrete objects, and more particularly to a machine for introducing discrete objects into a bed in which the items are processed, such as by cleaning or peeling.

Vegetables and other food products have traditionally been cleaned and peeled by hand, using a knife, brush or other tool to clean or remove the skin. Manual peeling and cleaning are time-consuming and the human peeler can be injured by mistake. Industrial peeling and cleaning of vegetables is commonly accomplished by machines that clean or remove an outer layer of the vegetables using rotating cylindrical brushes, abrasive or high-friction rollers, or other structures that rub against the vegetable's surfaces and remove matter. This action desirably removes the skin and most blemishes.

Some industrial peelers are referred to as "U-bed" or "J-bed" continuous peelers. This is because the brushes, rollers, or other cylindrical abrasive structures that rotate against the vegetables' surfaces are arranged substantially parallel and their axes, when viewed from one end, extend around a U-shaped or J-shaped curve. A peeler's "bed" (also referred to as "peel chamber") is formed by the shape of the collection of closely-spaced rolls that support the vegetables while peeling them. The rolls may be mounted to a frame, whether directly or indirectly (i.e., through another structure), so that the frame may be disposed in a plant where food is processed, either in a batch process or continuously. The produce may be placed in one end of the peel bed and removed from the opposite end. Alternatively the produce may be placed in the peel bed in a batch and the entire batch removed from the peeler at one time. In both scenarios, during the time that the produce is traversing the length of the peeler, or simply tumbling around in the peel bed, the produce encounters the abrasive surfaces sufficiently to accomplish the desired result.

The current technology of so-called U-bed or J-bed continuous peelers is divided into two distinct groups, which represent different styles of machines. The first group is characterized by products sold by Vanmark Equipment LLC, which use a peel bed made up of parallel abrasive rollers extending around a semicircle wrapping nearly 180 degrees, which means the rollers extend along the lowest portion of the peel bed and along both opposing sides of the peel bed in the shape of a half circle. When viewed from the end, the U-shaped or J-shaped curve that extends through the axles of the parallel rollers has a "diameter", which is the distance between a first abrasive surface on one side of the curve and a second, opposing abrasive surface on the opposite side of the curve.

The overall motion in this style machine can be seen as a rolling product bed that is revolving roughly around an imaginary center of the peel bed diameter. The driving force for the motion is the abrasive surfaces on the peeler rolls. When this abrasive "traction" is high the group of product pieces moves in an ever-turning loop around the peel chamber's imaginary center, thereby exposing different product surfaces to the active peeling roll surfaces. The peel bed diameter, when viewed end on, is of a sufficient dimension that a product piece falling from the top-most part of the path will fall and be driven by other falling pieces toward the entry point sufficiently far that each will be reintroduced to the peeling action. This cyclical motion provides a random circulation of pieces toward and away from the abrasive surfaces. In the process of this motion the individual produce piece is also desirably induced to randomly tumble within its own axes thus introducing different outer surfaces to the abrasive rolls.

In the case of continuous peelers, the motion of product longitudinally from the entry end to the exit end of the peel bed is driven by something akin to hydraulic leveling, because the combination of moving food product pieces, water and peel has fluid properties. The motion of the bed could be said to be "fluidized" and is somewhat unpredictable, because while one food product piece may reside in the bed for one amount of time, another piece may be resident in the bed for a different amount of time. Depending on the presentation of any given piece of product to the abrasive rolls the peeling effect may also exhibit similar variability. A constant infeed stream produces an equally constant exit stream similar to the water in a reservoir exiting over a dam as a result of forces caused by water introduced at the infeed end of the reservoir. Thus, as new product is introduced at the entry end the surface level of the moving product bed is forced to rise. With that rise, the product closest to the exit end spills over a threshold and exits the machine, thereby maintaining a product level equilibrium.

The second style machine is typically, but not necessarily, characterized by a larger diameter product bed with rolls often covering a smaller portion of the arc of the diameter than in the first style. The sides of the product bed are not intentionally specified dimensionally to maintain the product tumbling motion described in the first style. Without the rolling bed motion there is no guarantee that product will turn randomly or that it will move with a desirable level of uniformity through the machine.

To improve the movement of the pieces an auger is commonly introduced through the center of the machine, and the auger urges the product through the machine. The auger has the advantage of more precisely controlling the period of time the product stays in the machine even though the auger does not guarantee a particular dwell time within the peeler for each product piece. Thus, even with the auger, the pieces are only encouraged to move along the roll bed.

Because of the physical proximity of the auger's angled surfaces to the roll bed, the auger controls longitudinal movement by interfering with the random motion desired to present all surfaces to the peeling action of the machine. An auger presents a continuous angled surface area that bears against the food products, such as potatoes, and that contact prevents the food products from moving freely. Furthermore, an auger presents a central axle that represents a continuous barrier to free motion if the product bed depth seeks to be higher than the central axle. Both features of an auger inhibit the natural rolling of the fluid bed referred to above, and this limits the inherently thorough removal of skin and blemishes from all products. If the depth of the peel bed is higher than the axle or center of rotation of the auger, the desired control over the food product time within the peeler is lost as individual product pieces "spill over" the auger center into another cavity.

To overcome the disadvantage of this second type of peeler, peelers may be built with the larger bed diameter described above in association with the first type of machine. One advantage of this hybrid-style peeler over the first type is that it can be scaled quite large. One disadvantage is that when the bed is not tumbling freely, the ability to peel all surfaces evenly may be sacrificed.

Prior art peelers operate either in batch processes or continuous processes. In batch processes, the peeler is filled, the peeler operates, and then the peeler is emptied entirely. In continuous processes, product flows in one end and out the opposite end of a peeler, and, whether an auger is included in moving the product or not, an average dwell time is assumed for each product. Dwell time, which is the amount of time that a piece of food product dwells in a peeler, is an important factor, because it has an effect on how much of the food product's outer surface is abraded. In batch processing, the dwell time is known, but batch processing is known to lead to large variations in the amount of product in the processing stream. The dwell time is averaged for each food piece in prior art continuous process peelers, and this may lead to some products being over-peeled and others being under-peeled. Other factors, such as roll speed, bed depth (depth of the food products in the bed), and others, affect the level of peeling from a minimum of essentially cleaning to a maximum of removing more than all of the skin. Once these peel-impacting factors have been established to optimize the amount of peeling in a continuous operation, changing any of them will reduce optimization. That is because varying one factor alters the optimized operation.

Examples of prior art peelers may be found in U.S. Pat. Nos. 7,428,863; 7,197,978; 7,121,929 and 5,858,429, all to Wallace. The preceding patents are hereby incorporated by reference. With a batch or continuous process peeler, the only way to adjust for greater supply or demand from upstream or downstream equipment is to perform more or fewer batches or to speed up or slow down the continuous operation peeler. However, the batch machine requires manpower to operate and can only handle a predefined number of batches per unit time. Furthermore, continuous operation machines are not optimized when the speed, quantity of food products and other factors are altered. A peeler that overcomes the above-noted disadvantages is found in U.S. Pat. No. 10,143,227 to Mathues, which is incorporated herein by reference.

BRIEF SUMMARY OF THE INVENTION

Disclosed herein is an apparatus used for peeling or cleaning food products for use with machines that peel or clean food products. The peeling or cleaning apparatus has a plurality of rolls that remove food product skin, dirt or other substances from the exterior of food product or other objects by abrasion or otherwise when the objects are placed in the peel bed. The degree or amount the objects will be peeled may be affected by the distance from the point of food product infeed to the point of food product discharge (i.e., peel bed length). The longer the peel chamber, the more (or the more likely) the food product will be peeled.

An infeed mechanism that introduces food product to the peel bed is moveable longitudinally along the peel bed. This permits the operator of the machine to modify the effective peel bed length to a desired amount within the total length of the rolls in use. This is accomplished by moving the infeed mechanism upon which the objects are supported just prior to being inserted into the peel bed.

Disclosed herein is an apparatus for removing matter from exteriors of objects. The apparatus comprises a plurality of elongated, rotatable rolls forming a peel bed having an entry end near where the objects enter the peel bed and a discharge end where the objects exit the peel bed. An infeed mechanism is disposed adjacent the entry end and includes a surface upon which the objects may be supported while being displaced toward the peel bed. The surface may be the upwardly facing surface of a conveyor belt or a stationary surface upon which the objects are supported. The surface has a terminal end that is closest to the discharge end. At least the terminal end is movable, along the length of the rolls, from near the entry end toward the discharge end in order to move an insertion point of the objects into the peel bed along the length of the rolls.

In one embodiment, a wall is drivingly linked to the surface and is disposed adjacent the plurality of rolls. The wall is spaced from the rolls a distance that prevents the objects from passing between the wall and the rolls. In one embodiment, a scoop is positioned downstream of, and spaced from, the terminal end of the surface. The scoop receives the objects as they fall off the surface. In one embodiment, the surface is an upwardly facing surface of a conveyor belt that extends in a continuous loop around at least three rotating pulleys, wherein two of the at least three pulleys are displaceable relative to the rolls.

In one embodiment, at least one of the plurality of rolls has a first region at one longitudinal position and a second region at a second, different longitudinal position. The regions may differ in the effect they have at peeling objects. The at least one of the plurality of rolls removes more matter from exteriors of objects at the first region than at the second region.

Disclosed herein is an infeed apparatus for a peeler that removes matter from exteriors of food products. The infeed apparatus uses a plurality of elongated, rotatable rolls forming a peel bed having an entry end near where the products enter the peel bed, and a discharge end where the products exit the peel bed. The apparatus comprises a surface upon which the products may be supported while being conveyed into the peel bed. The surface has a terminal end that is closest to the discharge end. At least the terminal end is movable, along the length of the rolls, from near the entry end toward the discharge end.

In one embodiment, a wall is drivingly linked to the surface and disposed adjacent the plurality of rolls. The wall is spaced from the plurality of rolls a distance that prevents the products from passing between the wall and the rolls. In one embodiment, a scoop is positioned downstream of, and spaced from, the terminal end of the surface.

In one embodiment, the surface is an upwardly facing surface of a conveyor belt that extends in a continuous loop around at least three rotating pulleys, wherein two of the at least three pulleys are displaceable relative to the rolls. In one embodiment, at least one of the plurality of rolls has a first region at one longitudinal position and a second region at a second, different longitudinal position. The at least one of the plurality of rolls removes more matter from exteriors of objects at the first region than at the second region.

Disclosed herein is a method of removing matter from exteriors of a plurality of objects. The method comprises rotating a plurality of elongated rolls forming a peel bed having an entry end near where the objects enter the peel bed and a discharge end where the objects exit the peel bed. Another step is displacing at least a terminal end of a surface of an infeed mechanism toward the discharge end from a position near the entry end. The terminal end is an end of the surface that is closest to the discharge end. The surface is configured to support objects while the objects are conveyed into the peel bed. In one embodiment, the method further comprises displacing a wall, which is drivingly linked to the surface, along with the terminal end of the surface. The wall is disposed adjacent, and spaced from, the plurality of rolls a distance that prevents the objects from passing between the wall and the rolls.

In one embodiment, the method further comprises displacing a scoop, which is drivingly linked to the surface, along with the terminal end of the surface. The scoop is positioned downstream of, and spaced from, the terminal end of the surface. In one embodiment, the method further comprises displacing downstream an upwardly facing surface of a conveyor belt that extends in a continuous loop around at least three rotating pulleys, wherein two of the at least three pulleys are displaceable relative to the rolls.

Figure 1:
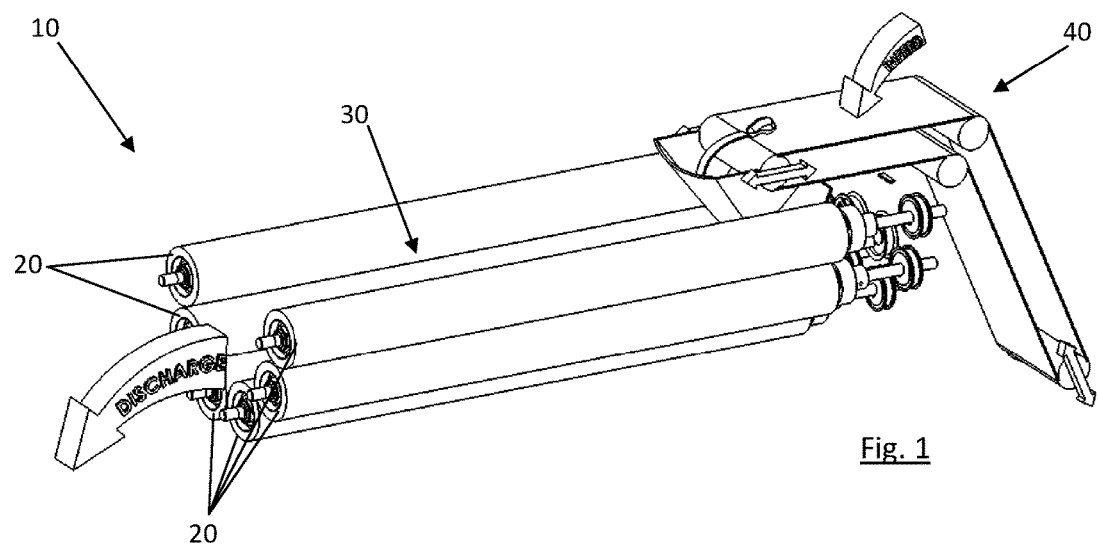
FIG. 1 is a view in perspective illustrating an embodiment of the present invention.

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose. For example, the word connected or terms similar thereto are often used. They are not limited to direct connection, but include connection through other elements where such connection is recognized as being equivalent by those skilled in the art.

DETAILED DESCRIPTION OF THE INVENTION

U.S. Provisional Application Serial No. 62/829,419, filed Apr. 4, 2019, which is the above claimed priority application, is incorporated in this application by reference.

As shown in FIG. 1, the cylindrical rolls 20 are aligned in a parallel fashion to one another to form the peel bed 30 therebetween. The arrows in FIG. 1 represent the locations and paths of product infeeding to, and discharging from, the apparatus 10. An entry end 32 is on the right in the orientation of FIG. 1, and a discharge end 34 is on the left. The rolls 20 are rotated at high speed as described in the references incorporated herein, such as by an electric or pneumatic rotary motor, thereby causing the peeling and/or cleaning of the food product. The infeed mechanism 40 may be disposed at or near the entry end 32 and introduces food product to the peel bed 30. The introduced food product moves "downstream" (from right to left in the orientation of FIG. 1) along the peel bed 30 and is discharged at the opposite longitudinal discharge end 34 of the peel bed 30. Thus, the infeed mechanism 40 is positioned upstream of the discharge end 34, and the discharge end 34 is positioned downstream of the infeed mechanism 40.

The rolls 20 are disposed in a U-shaped bed that may have a serpentine drive system. It is contemplated that the distance between the opposing sides of the peel chamber 30 may range from slightly more than the diameter of a food product, such as a potato, to multiples of the diameter of a food product. In the description herein, potatoes are examples used to describe the operation of the machine, but any food product or other object that needs to be cleaned, peeled or otherwise abraded may be used in the contemplated apparatus. Where a potato is referenced, it is exemplary of all objects, not exclusive.

Figure 2:
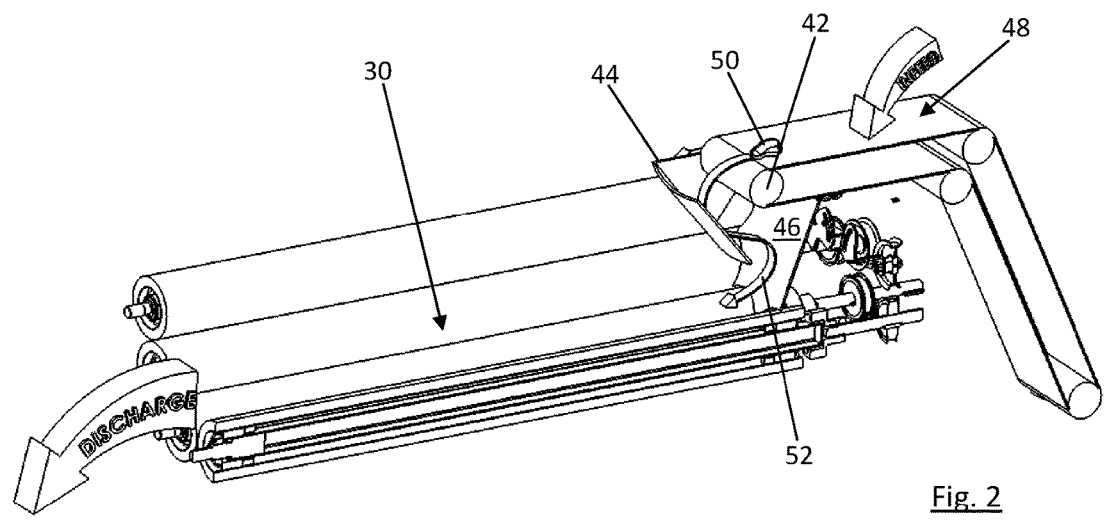
FIG. 2 is a view in perspective illustrating the embodiment of FIG. 1 after sectioning the embodiment through a longitudinal, medial plane.

In FIG. 2, which is a view in section of FIG. 1 through the lowest roll 20, the arrow 52 represents the path a potato 50 follows from the infeed mechanism 40 into the peel chamber 30. The potato 50 is conveyed by the conveyor belt 48 toward the peel bed 30 and drops downwardly toward the scoop 44 when it reaches the terminal end 51 of the conveyor belt 48 at the pulley 42. It is contemplated that objects may alternatively slide along a planar or curved plate forming a chute that uses gravity to move objects along stationary, inclined surfaces. The potato 50 may contact the scoop 44 and the angled wall 46 just before reaching the peel chamber 30 after falling off the terminal end 51 of the conveyor belt 48. The scoop 44 and wall 46 may be fixed directly to components of the infeed mechanism 40, or they may be fixed to other structures that are fixed directly to other components of the infeed mechanism 40. The scoop 44 and wall 46 may be "drivingly linked" to other components of the infeed mechanism 40, such as a subframe (not visible) to which the pulleys 42 and 43 are rotatably mounted. This link results in the scoop 44 and the wall 46 maintaining their positions on the infeed mechanism 40, and more specifically relative to the pulley 42 over which the conveyor belt 48 extends, during all longitudinal movement of the entire infeed mechanism 40 relative to the rolls 20 as described herein. The wall 46 is drivingly linked to the surface of the conveyor belt 48, such as through the subframe to which the pulley 42 is mounted. The longitudinal movement of the entire infeed mechanism 40 is along a path that is parallel to the longitudinal axes of the rolls 20 defining the peel bed 30. The longitudinal movement of the infeed mechanism 40 preferably does not have a lateral (transverse to the longitudinal axes of the rolls) component, because lateral movement could cause contact between the wall 46 and the rolls 20. Instead the movement of the infeed mechanism 20 is parallel to the axes of the rolls 20.

When it drops off the terminal end 51 from the conveyor belt 48, the potato 50 strikes the scoop 44, thereby slowing the potato's fall and changing the trajectory of the potato to an upstream direction toward the rest of the infeed mechanism 40. The scoop 44 may be made of flexible or rigid material to accommodate food products that may bruise more easily. Examples of flexible material include sheet metal, polymers, rubber, and other food-safe materials. Rigid materials include plate metal and others. This redirecting by the scoop 44, which may be disposed just downstream from the terminal end 51, prevents the potato from progressing downstream into the peeling chamber 30 directly from the infeed mechanism 40, as would be the case if the potato merely dropped from the conveyor 48 directly into the peel chamber 30.

In the embodiment of FIGS. 1-6, after it deflects off the scoop 44, the potato 50 contacts the angled wall 46, thereby further reducing the potato's speed of descent and changing its direction toward downstream once again. The potato 50 continues down the wall 46 toward the rolls 20 in a downstream direction toward the discharge end 34 of the peel bed 30. Because the potato 50 is limited in its movement by the scoop 44 and the wall 46, the potato falls to a well-defined starting position against the rolls 20. The angled wall 46 serves as a backstop to prevent potatoes from moving any further toward the entry end 32 than the wall 46. All potatoes are thereby permitted to travel only between the wall 46 and the discharge end of the peel bed 30.

It is contemplated that the surface of the scoop 44 that the potato may strike, and the surface of the wall 46 that the potato may strike, are angled relative to vertical about 0 to 60 degrees. Preferably, the scoop 44 is at an angle relative to vertical of about 30 degrees and the wall 46 is preferably vertical. The top edge of the scoop 44 may be spaced longitudinally about six inches from the terminal end 51 of the conveyor belt 48, but this is affected by the size of the items being inserted into the peel bed. The top edge of the wall 46 may be spaced about 24 inches upstream from the top edge of the scoop 44 in this example embodiment. For other products with varying size, these distances may be modified.

Figure 3:
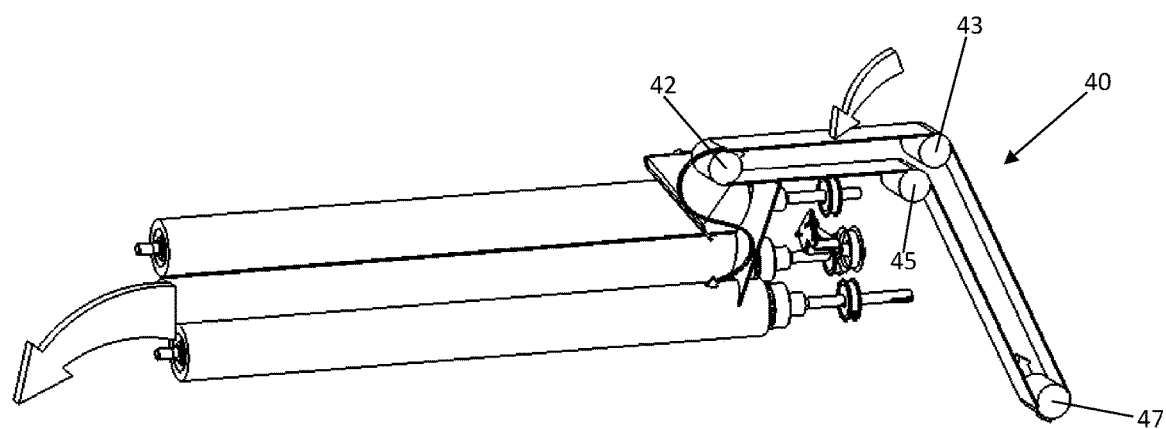
FIG. 3 is a schematic side view illustrating the embodiment of FIG. 1 in section with the infeed mechanism in a home position.
Figure 4:
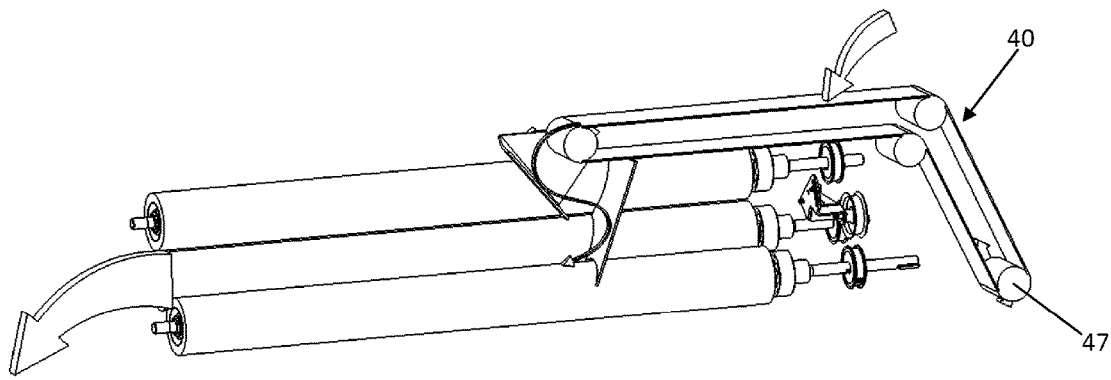
FIG. 4 is a schematic side view illustrating the embodiment of FIG. 1 in section with the infeed mechanism in a position intermediate the home and fully downstream position.
Figure 5:
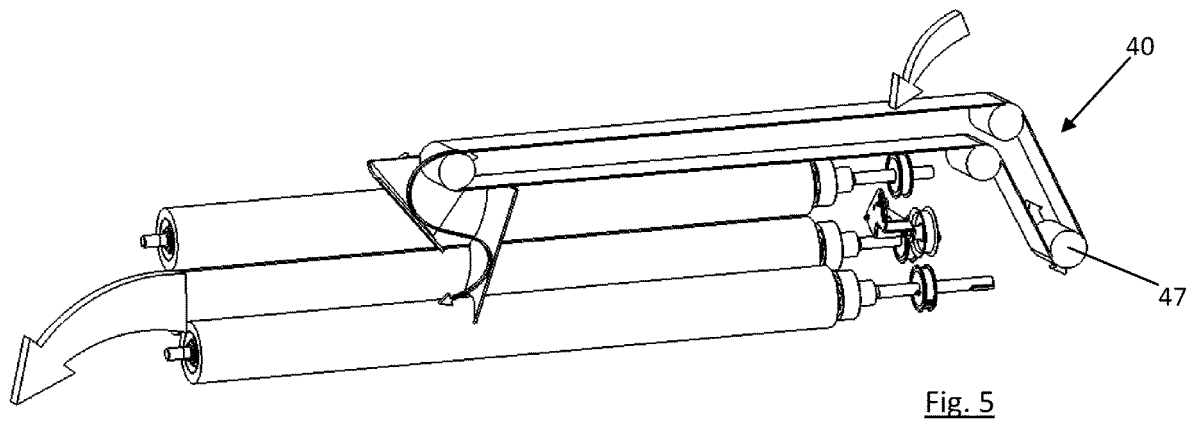
FIG. 5 is a schematic side view illustrating the embodiment of FIG. 1 in section with the infeed mechanism in a downstream position.

The conveyor of the infeed mechanism 40 is designed to accommodate the movement of the infeed mechanism 40 downstream from the home position (as shown in FIG.3), utilizing the full extent of the rolls 20 to the most downstream position (as shown in FIG. 5). The length of the conveyor belt 48 is preferably fixed and at least some of the pulleys may move relative to the rolls 20. Thus, as the leading pulley 42 translates horizontally and longitudinally downstream relative to the rolls 20 toward the discharge end 34 (see progress in FIGS. 3 to 5), the trailing pulley 47 climbs up the incline towards the fixed pulleys 43 and 45 located in the corner of the conveyor belt 48. All pulleys may be rotatably mounted to a subframe (not visible). It is contemplated that the trailing pulley 47, which is preferably an idler (not driven), may be biased toward its position when the infeed mechanism 40 is in the home position (shown in FIGS. 1-3), which is downward in the orientation of FIG. 3. As the lead pulley 42 is driven downstream, such as by a pneumatic ram or other prime mover (not shown) relative to the rolls 20, the conveyor belt 48 applies an increased tensile force to the trailing pulley 47, thereby overcoming the downward bias (such as the weight of pulley 47 or a coil or pneumatic spring) applied to the axle of the trailing pulley 47. This upward movement of the trailing portion of the conveyor belt 48 toward the fixed pulleys 43 and 45 permits the trailing pulley 47 to move about the same distance as the lead pulley 42 is driven longitudinally downstream. As the lead pulley 42 is driven further downstream to the position shown in FIG. 5, the trailing pulley 47 is pulled further upward toward the fixed pulleys 43 and 45 by the conveyor belt 48 until the lead pulley 42 is as far downstream as it can be driven.

Although the conveyor belt 48 is shown at an angle between the pulleys 43 and 54 and the pulley 47, in order to save space, the conveyor belt 48 may be in a vertical orientation. Still further, numerous movable pulleys (not shown) may be used to create a sinusoidal-shaped portion of the conveyor that accommodates the movement of the conveyor belt without taking up too much space.

The infeed mechanism 40, or at least portions thereof, has at least a surface upon which objects are supported while being displaced toward the peel bed. This surface is longitudinally moveable along a path substantially parallel to the rolls 20 from a most upstream ("home") position, as shown in FIGS. 1 and 2, toward a most downstream position, as shown in FIG. 5. There may be one (as shown in FIG. 4) or more intermediate positions. There are preferably an infinite number of positions at which the infeed mechanism 40 may be positioned between the most upstream and the most downstream positions, but it is contemplated that there may be a finite number of such positions.

When the amount of peeling of the food products or objects is desired to be larger, the infeed mechanism 40 may be moved to the most upstream position (entry end 32) and food products are conveyed by the conveyor belt 48 into the peel chamber 30 starting at the most upstream position. This causes the apparatus 10 to peel the food product along the longest effective peel chamber 30. The effective peel chamber is the portion of the peel chamber that may peel, clean or otherwise treat objects therein and extends from the wall 46 to the discharge end 34. When the amount of peeling is desired to be smaller, the infeed mechanism 40 is moved to a more downstream position and food products are conveyed by the conveyor belt 48 into the peel chamber 30 starting at a more downstream position. This causes the apparatus 10 to peel the food product along an effective peel chamber 30 length that is less than the longest. When the amount of peeling is desired to be even smaller, the infeed mechanism 40 is moved to the most downstream position and food products are conveyed by the conveyor belt 48 into the peel chamber 30 at the most downstream position. This causes the apparatus 10 to peel the food product along the shortest effective peel chamber 30 length. As the moving infeed mechanism 40 translates towards the discharge end 34, the scoop 44 and the wall 46 travel as part of the infeed mechanism 40, thereby reducing the exposed length of roll 20 between the point of potato introduction and the discharge end 34.

By utilizing varying degrees or types of abrasiveness along the lengths of one or more of the rolls 20, and thus along the peel bed 30, the infeed mechanism 40 can provide a new level of tuning and adjustability for varying properties of product to be peeled or abraded. Near the infeed end, a region of the roll (e.g., between ⅕ and ⅔ of the length), may be more abrasive than the remainder of the roll that is closer to the discharge end. The region of the roll with greater abrasiveness may be necessary or desirable to clean or peel products with properties that make this more difficult. Thus, the position of the infeed mechanism 40 may be adjusted longitudinally to introduce easier to peel or clean product to only the less abrasive regions of the roll closer to the discharge end, and more difficult to clean or peel product at various points along the rolls 20 to expose the product to a longer part of the more abrasive region along with all of the less abrasive region. Thus, with an apparatus described herein having one or more rolls with a higher abrasive region upstream and a lower abrasive region downstream, one may utilize the infeed mechanism's 40 longitudinal adjustability to customize a point of product introduction that matches the product's need for peeling or cleaning.

Figure 6:
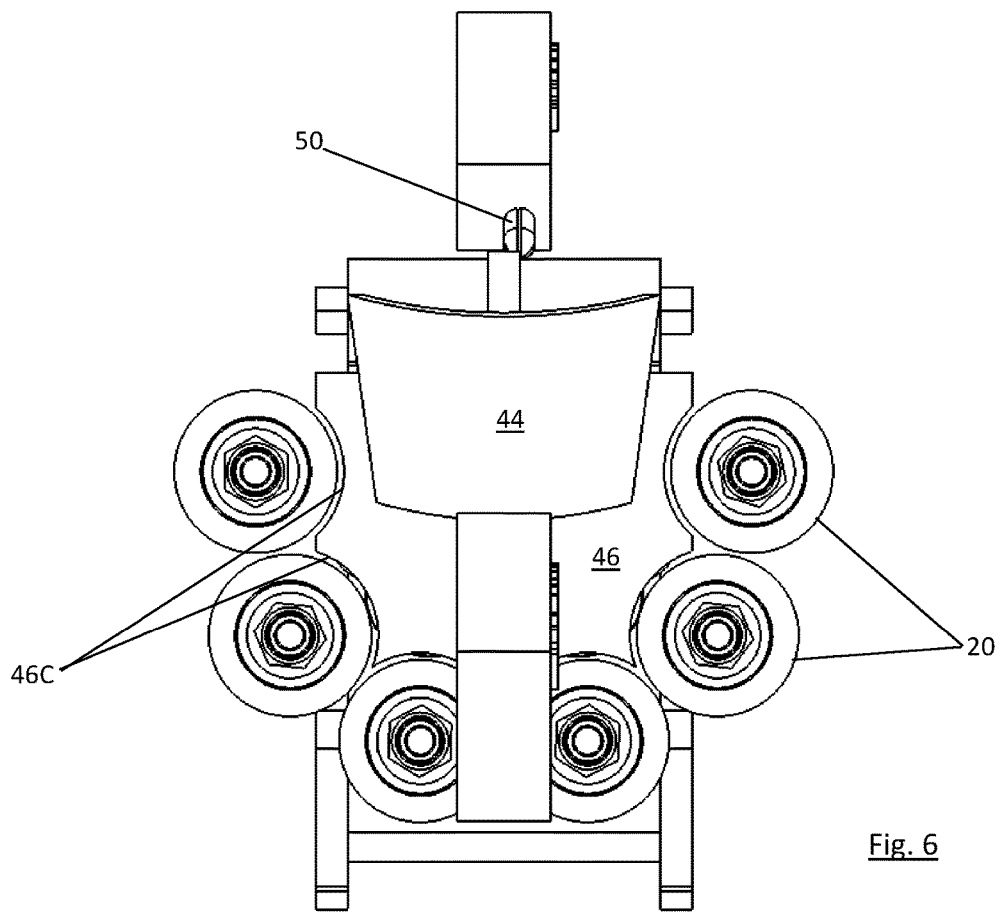
FIG. 6 is an end view of the embodiment of FIG. 1 with the illustrative arrows in place.

FIG. 6 is an end view of the embodiment shown in FIG. 1, showing the shape of the angled wall 46. The wall 46 may be a plate or panel that has curved cutouts 46C to accommodate the shape of the rolls 20 so that the wall 46 may extend into the crevices between the rolls 20 to prevent food products from passing by the wall 46. As the wall 46 is conveyed parallel to the axes of the rolls 20 between the most upstream and most downstream positions, there is preferably no contact between the wall 46 and the rolls 20, or at least no contact that causes damage or substantial wear to either. It is desired that small gaps are formed between the wall 46 and the rolls 20, as are visible in FIG. 6. The size of the gaps is preferably smaller than half the diameter of the smallest food product that will be used in the apparatus 10. A contemplated gap is in a range between about one-eighth of an inch and about one-half inch.

When the term "peeling" is used herein, this can mean other operations on products that are similar, or understood in the field to be related, to peeling when used in relation to mechanical peelers. For example, "abrading," "washing," "scrubbing," or other terms may be substituted for "peeling" above, as will be understood by the person of ordinary skill in the art. This is because the apparatus described herein may be used with food products such as potatoes, carrots, beets, or any other food product that is desirably skinned, cleaned, or surface treated by rotating rolls, such as the rolls 20. Furthermore, the structures described herein may be used with non-food products that are desirably treated by rotating rolls. An example is a spherical plastic object that may have been molded or otherwise manufactured with protruding features, such as runners, parting lines, mold flash, etc. The structures and apparatuses described herein are capable of removing such runners and other undesirable features from non-food objects, and the operation of removing these undesirable features is referred to herein as "peeling" and "cleaning."

It is conceivable for the infeed mechanism 40 to be coupled with automated peel level analysis at the discharge end. A system, such as video cameras combined with optical recognition software, optical sensors, still cameras, and/or vision systems, may be used to "grade" the peel level of a product by detecting defects, colorations, or other features. Such a system may provide electronic feedback to a control system integrated with this machine. This feedback may be used to automate and adjust the position of the infeed mechanism 40, namely, the lead pulley 42, the scoop 44, and the wall 46, until the desired peel level at the discharge end is achieved. Once the desired peel level is achieved the position of the infeed mechanism 40 may be maintained and/or modified as determined by the system. This type of automation system could also be used to indicate when rolls 20 are worn or in need of replacement.

When the infeed mechanism 40 is at the "home" position and the apparatus is operating, the resulting products are exposed to the maximum peel bed 30 length. In this situation, the most abrading action will occur to products introduced to the peel bed when bed depth and roll speed have been optimized for a particular product (as described in the patents incorporated by reference). Furthermore, if the desired peel level is still not achieved, this condition may be programmed into the system to indicate that the rolls 20 are worn or require replacement to achieve desired results for a given product.

The pulley arrangement of infeed mechanism 40 may also be shaped with a slight angle at the fixed infeed point so that the peel bed 30 may be tilted by increasing the elevation at the infeed end. Thus, the peel bed may slope downhill towards the discharge end to allow gravity to aid in driving product through the peel bed 30 and towards the discharge. In a further alternative, a moving conveyor structure, such as the conveyor belt 48, may not be used as the surface upon which the potatoes rest just prior to being fed into the peel bed. In an alternative, a chute utilizing a stationary, angled plate or panel, may be used instead of a moving conveyor. In such an alternative, the angle of the plate and the influence of gravity cause the potatoes or other objects to roll into the peel bed. In order to accommodate the infeed mechanism being displaced along the peel bed, a flexible web, similar to a conveyor belt material, may form the surface upon which the objects rest until they are fed into the peel bed. Such an elongatable, but stationary, material provides the upwardly-facing surface upon which potatoes roll into the peel bed, but may be stretched or unrolled when the infeed mechanism is displaced toward the discharge end. The same material may contract or be rolled up when the infeed mechanism is displaced toward the entry end. Non-flexible plates or panels may overlap with one another to accommodate relative movement of the infeed mechanism, in the manner of a telescope and form a chute. Thus, a variety of structures may be used to provide the surface upon which potatoes and other objects rest prior to being fed into the peel bed. Each of these structures will have a corresponding terminal end that is the part of the surface closest to the discharge end of the peel bed.

This detailed description in connection with the drawings is intended principally as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention and that various modifications may be adopted without departing from the invention or scope of the following claims.

The invention claimed is:

1. An apparatus for removing matter from exteriors of objects, the apparatus comprising:
   (a) a plurality of elongated, rotatable rolls forming a peel bed having an upstream entry end near where the objects enter the peel bed and a downstream discharge end where the objects exit the peel bed; and
   (b) an infeed mechanism disposed adjacent the rolls and including a surface upon which the objects may be supported while being displaced toward the peel bed, the surface having a terminal end that is an end of the surface that is closest to the discharge end, wherein a home position is the most upstream position of the terminal end, wherein at least the terminal end is movable, along the length of the rolls, at least about 10% of a distance between the home position and the discharge end to move an insertion point of the objects into the peel bed along the length of the rolls, wherein the apparatus is configured to expose the objects to a smaller portion of the rolls to the extent the terminal end is moved toward the discharge end from the home position.

2. The apparatus in accordance with claim 1, wherein the infeed mechanism further comprises a wall drivingly linked to the surface and disposed adjacent the plurality of rolls, the wall being spaced from the plurality of rolls a distance that prevents the objects from passing between the wall and the rolls.

3. The apparatus in accordance with claim 2, wherein the infeed mechanism further comprises a scoop positioned downstream of, and spaced from, the terminal end of the surface.

4. The apparatus in accordance with claim 1, wherein the surface is an upwardly facing surface of a conveyor belt that extends in a continuous loop around at least three rotating pulleys, wherein two of the at least three pulleys are displaceable relative to the rolls.

5. The apparatus in accordance with claim 4, wherein at least one of the plurality of rolls has a first region at one longitudinal position and a second region at a second, different longitudinal position, whereby the at least one of the plurality of rolls removes more matter from exteriors of objects at the first region than at the second region.

6. An infeed apparatus for a peeler that removes matter from exteriors of food products using a plurality of elongated, rotatable rolls forming a peel bed having an entry end near where the products enter the peel bed and a discharge end where the products exit the peel bed, the apparatus comprising a surface upon which the products may be supported while being conveyed into the peel bed, the surface having a terminal end that is closest to the discharge end, wherein at least the terminal end is movable, along the length of the rolls, from near the entry end toward the discharge end.

7. The infeed apparatus in accordance with claim 6, further comprising a wall drivingly linked to the surface and disposed adjacent the plurality of rolls, the wall being spaced from the plurality of rolls a distance that prevents the products from passing between the wall and the rolls.

8. The infeed apparatus in accordance with claim 7, further comprising a scoop positioned downstream of, and spaced from, the terminal end of the surface.

9. The infeed apparatus in accordance with claim 6, wherein the surface is an upwardly facing surface of a conveyor belt that extends in a continuous loop around at least three rotating pulleys, wherein two of the at least three pulleys are displaceable relative to the rolls.

10. The infeed apparatus in accordance with claim 9, wherein at least one of the plurality of rolls has a first region at one longitudinal position and a second region at a second, different longitudinal position, whereby the at least one of the plurality of rolls removes more matter from exteriors of objects at the first region than at the second region.

11. A method of removing matter from exteriors of a plurality of objects, the method comprising:
  (a) rotating a plurality of elongated rolls forming a peel bed having an upstream end near where the objects enter the peel bed and a downstream discharge end where the objects exit the peel bed; and
  (b) displacing at least a terminal end of a surface of an infeed mechanism toward the discharge end from a home position, which is the most upstream position of the terminal end, by at least about 10% of a distance from the home position to the discharge end, wherein the terminal end is an end of the surface of the infeed mechanism that is closest to the discharge end and the surface of the discharge end is configured to support objects while the objects are conveyed into the peel bed, thereby exposing the objects to a smaller portion of the rolls to the extent the terminal end is moved toward the discharge end from the home position.

12. The method in accordance with claim 11, further comprising displacing a wall, which is drivingly linked to the surface, along with the terminal end of the surface, wherein the wall is disposed adjacent, and spaced from, the plurality of rolls a distance that prevents the objects from passing between the wall and the rolls.

13. The method in accordance with claim 12, further comprising displacing a scoop, which is drivingly linked to the surface, along with the terminal end of the surface, wherein the scoop is positioned downstream of, and spaced from, the terminal end of the surface.

14. The method in accordance with claim 11, further comprising displacing downstream an upwardly facing surface of a conveyor belt that extends in a continuous loop around at least three rotating pulleys, wherein two of the at least three pulleys are displaceable relative to the rolls.

* * * * *